United States Patent [19]

Marks et al.

[11] Patent Number: 5,312,139
[45] Date of Patent: * May 17, 1994

[54] FLUID LINE NUT LOCKING DEVICE

[75] Inventors: Ernest E. Marks; Willard L. Hofer, both of Boise, Id.

[73] Assignee: Micron Technology, Inc., Boise, Id.

[*] Notice: The portion of the term of this patent subsequent to Jun. 29, 2010 has been disclaimed.

[21] Appl. No.: 113,447

[22] Filed: Aug. 27, 1993

[51] Int. Cl.⁵ ............................................. F16L 35/00
[52] U.S. Cl. ..................................... 285/39; 285/92; 285/420; 411/120; 403/11; 403/19
[58] Field of Search .................. 285/92, 39, 81, 82, 285/420, 367; 70/229, 230, 231, 232; 403/11, 19; 411/119, 120, 121

[56] References Cited

U.S. PATENT DOCUMENTS

| | | | |
|---|---|---|---|
| 341,170 | 5/1886 | Reese | 70/232 |
| 619,795 | 2/1899 | Schreiner | 70/232 |
| 725,290 | 4/1903 | Speer | 70/232 |
| 1,208,236 | 12/1916 | Thompson | 285/80 |
| 3,284,121 | 11/1966 | Lyon | 285/80 |
| 3,375,026 | 3/1968 | Szohatzky . | |
| 3,486,775 | 12/1969 | Callahan et al. | 285/348 |
| 3,521,910 | 7/1970 | Callahan et al. | 285/14 |
| 3,618,987 | 11/1971 | Carbone | 285/334.5 |
| 3,678,717 | 7/1972 | Eaton | 70/232 |
| 3,761,117 | 9/1973 | Scheitlin et al. | 285/192 |
| 3,777,782 | 12/1973 | Shendure | 137/614.02 |
| 4,076,286 | 2/1978 | Spontelli | 285/341 |
| 4,655,482 | 4/1987 | Myers et al. | 285/81 |
| 4,826,215 | 5/1989 | Sullivan | 285/80 |
| 5,139,289 | 8/1992 | Koss | 285/92 |
| 5,222,768 | 6/1993 | Hofer et al. | 285/39 |
| 5,239,848 | 8/1993 | Nichols, Jr. | 285/80 |

*Primary Examiner*—Eric K. Nicholson
*Attorney, Agent, or Firm*—Lia M. Pappas

[57] ABSTRACT

A detachable locking device is described which consists of a pair of standard box end wrenches with shortened handles having integral ears on the ends of the handles with openings therethrough. The wrenches are designed to be retrofittably placed behind the respective connecting nuts on the line termination point adapter assemblies which are to be joined. The preliminary connection and seal are made using conventional means and the connecting nuts are torqued to near their optimum value. The wrench heads of the locking device are then positioned on the nuts so that a connecting bolt can be passed through the openings in the ears on the handles, a nut attached thereto and then tightened to hold and secure the connecting nuts together and prevent the nuts from loosening or seal leaking during the operation of the fluid transmission line.

17 Claims, 3 Drawing Sheets

FLUID LINE NUT LOCKING DEVICE

BACKGROUND OF THE INVENTION

1. Field of the Invention

This invention relates to a removable locking device to hold and secure the connection between typical nut type end fittings on two fluid transmission lines being detachably joined together.

2. Background

Fluid transmission lines, such as those carrying reactive gases used in certain semiconductor manufacturing processes, are often vulnerable to leaks or breakage induced by stress from vibration, twisting, temperature change or other environmental conditions. This frequently results in significant downtime, costly repairs and loss of production.

Standard, detachable nut type fittings such as, but not limited to those supplied by Cajon Company, Macedonia, Ohio and C.G.M.I., France, rely principally upon friction and threaded type connection to achieve and maintain tight, leak proof seals which are generally resistant to significant leakage or breakage. Experience has shown that such connections do fail, under continuous use, from vibration, line twisting and temperature change, often enough to affect significantly the above mentioned industrial operations. Experience has also shown that the failure occurs most frequently at the union of the lines, due to loosening of the detachable, nut type connecting fittings.

Review of the patent literature indicates that there are many lock type devices designed to hold a variety of nut type end fittings together. However most of them are of special, often complicated design, requiring customized components not readily adaptable to commercially available, standard detachable nut type fittings.

U.S. Pat. No. 5,222,768, entitled "Fluid Line Nut Locking Device," having common inventors with the present application, and assigned to Micron Technology, Inc. describes a very worthwhile device for locking fluid line valves. The above cited patent is ideally suited for new installation of transmission lines and valves.

However, there are a great many valves and fluid transmission lines already installed in semiconductor fabs throughout the world. It is a very difficult and cumbersome task to disassemble the fluid lines, drain the fluids, install a valve lock, and then, have the lines requalified for use in the manufacturing process. Thus, there exists a tremendous need to have a fluid line nut locking device that is capable of being retrofitted to the transmission lines already in place in existing semiconductor fabs.

SUMMARY OF THE INVENTION

The present invention provides a simple, retrofittable, detachable locking assembly to secure a gas tight connection between standard nut type adapter fittings used to detachably join two fluid transmission lines, which lines are typically employed with pressurized reactive gases used in the manufacture of semiconductor components.

The gas lines, their nut type connecting assembly and the sealing mechanism used therebetween which are used in the present invention are well-known, vary with the use for which they are intended.

The removable nut locking device comprises a pair of standard wrench-type heads which can be of any of a variety of shapes, including, but not limited to open-ended, variable, adjustable, rachet, etc. Attached to the wrench-type heads are shortened, modified handles having either an annular or slotted hole therein to enable them to be adjustably locked together by means of a suitable bolt and nut, when each has been placed on an opposing connecting nut of the two opposing gas lines and the sealed connection has been made.

The connecting seal is made, and the connecting nuts are torqued to near their optimum value preferably, before the locking wrench assembly is placed upon the respective connecting nuts.

The retrofittable wrench-heads of the present invention can be placed upon the respective individual gas lines before or after the two lines have been connected and the nuts torqued to near their optimum value.

The wrenches are positioned about the respective nuts, both axially and angularly, in such a manner that the final, rotational adjustment of the nuts will place the shortened and modified handles of the wrenches in close proximity and alignment with each other so that the handles can be locked together by a suitable threaded bolt and attachable nut.

Locking the two connecting nuts together according to the present invention counteracts any twisting in the gas lines and the resulting loosening of connections, which often occurred with this type of gas line connection prior to the development of the present invention.

The tension on the locking bolt which holds the two wrenches together, also holds the wrenches in place upon the respective connecting nuts. However, where the line union is in a position other than a horizontal position, or where severe vibration or temperature changes may occur, the wrenches may be secured to the nuts by means of set screws (not shown) to prevent the nut locking assembly from being dislodged from the connecting nuts.

DESCRIPTION OF THE PREFERRED EMBODIMENTS

The preferred embodiments illustrate typical applications for the fluid line connecting nut locking device as a means for holding and securing the connecting nuts and seal between two pressurized gas lines, such as those used to carry reactive gases employed in various semiconductor manufacturing processes. The connecting lines, their adaptive end connecting means and the sealing means between are standard, commercially available, typical means, such as those provided by Cajon Company and C.G.M.I.

For examples of fluid line connectors, see: "Tube Fitting," "Method of Assembly of Tube," "Double Ended Shut Off Coupling," "Quick Connect Fitting," "Leak-Tight Coupling," and "Fitting," having the following respective U.S. Pat. Nos. 4,076,286; 3,838,493; 3,777,782; 3,761,117; 3,618,987; and 3,486,775.

The nuts on the ends of the gas lines to be detachably joined are usually of similar size and design, of mating or matching configuration and are amenable to control and operation by the type of nut lock described in the two preferred embodiments of this invention. Of course variations and modifications in shape and size will be obvious to those familiar with the art.

Figure 3:
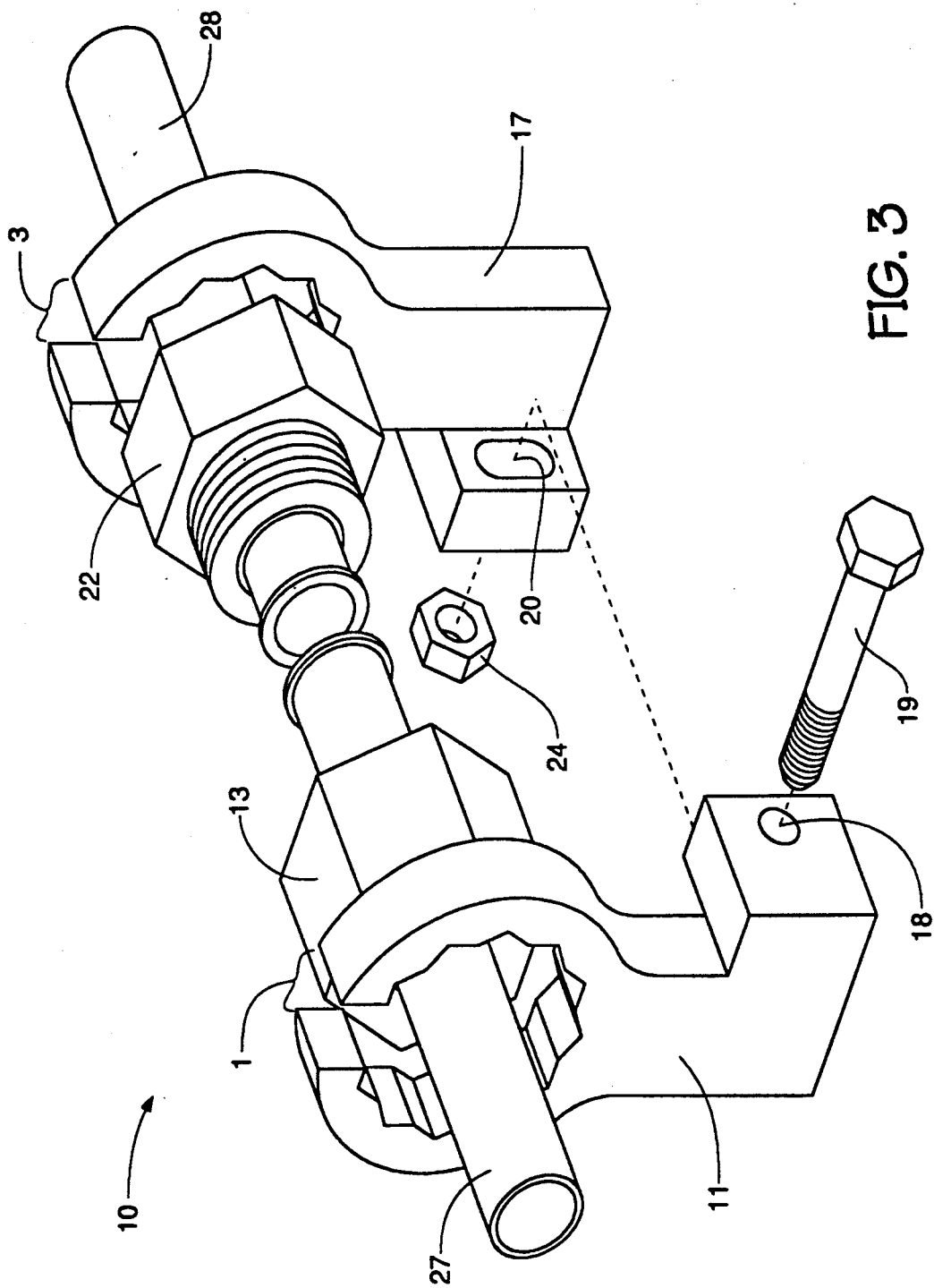
FIG. 3 is an isometric view of the wrench-head nut locking assembly of FIGS. 1 used in a further embodiment of the present invention.

One embodiment is illustrated in FIG. 3 which shows two generally matching wrench-type heads with shortened handles, which are the essential parts of this invention and designated by the numeral 10. The wrench-heads can have any of a variety of shapes, including, but not limited to, open, adjustable, variable, rachet, etc.

Each of the illustrated wrench means has flat, parallel front and rear opposing sides, with said front sides facing each other when assembled as shown in FIG. 3. The wrench means also comprises smooth, rounded ends on the exterior surfaces of the wrenches which circumscribe the gripping surfaces of the wrenches.

In one embodiment the respective wrenches are configured in a typical, known, 12 point design, which closely circumscribes the typical hexagonal connecting nut and permits fine angular adjustment of the respective nuts after they are appropriately tightened to achieve a suitable seal (not shown) between the gas lines being joined and to align the two openings in the handles to permit a threaded bolt to be introduced therethrough and an appropriate threaded nut attached thereto to hold the two wrenches together.

Figure 1A:
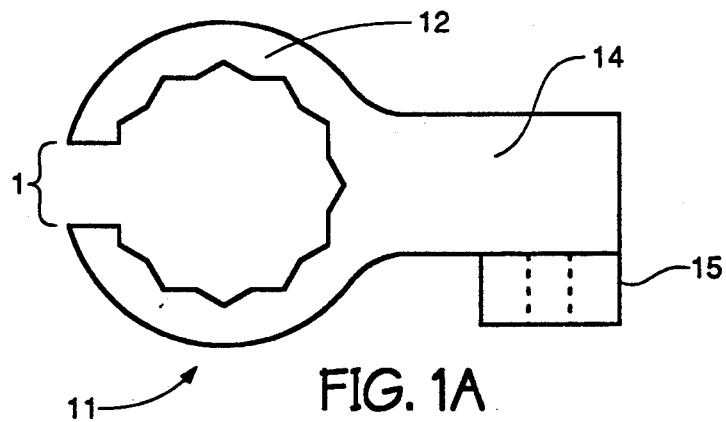
FIGS. 1A, 1B, 1C are front, side and top schematic views, respectively, of one type of wrench-head nut locking assembly used in one embodiment of the present invention.
Figure 1C:
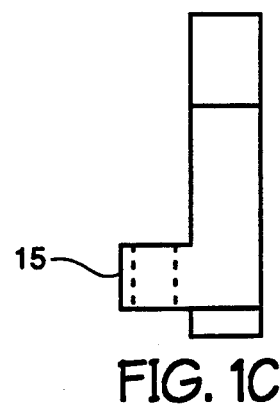
Figure 1B:
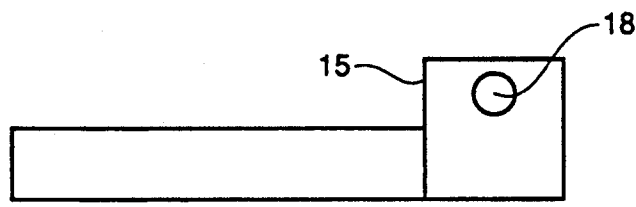
Figure 2A:
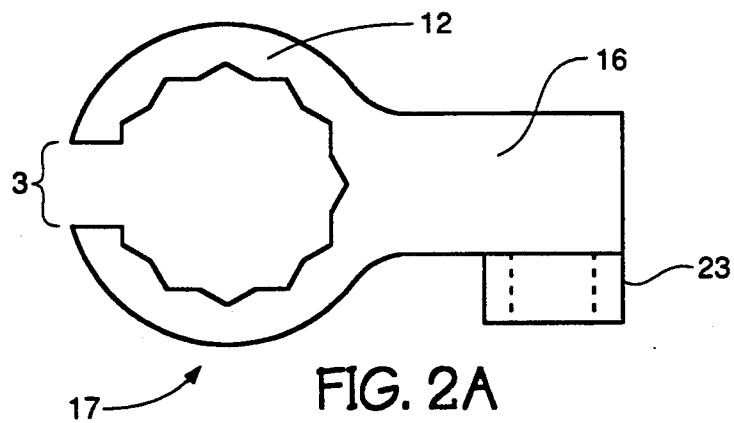
FIGS. 2A, 2B, 2C are front, side and top schematic views, respectively, of another type of wrench-head nut locking assembly used in another embodiment of the present invention.
Figure 2C:
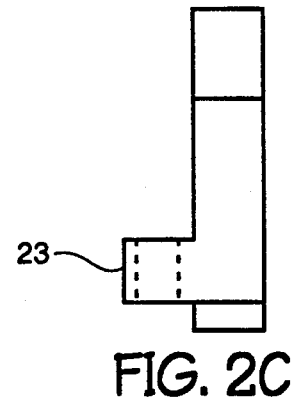
Figure 2B:
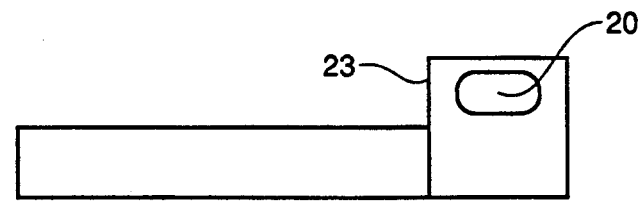

FIG. 1A shows a view of the front side of one wrench head 11, having a typical 12 point holding and gripping means of known design 12, to closely circumscribe and hold a typical hexagonal connecting nut 13, as shown in FIG. 3. The wrench also comprises an integral, generally rectangular, short handle 14, with parallel opposing flat edges and sides extending laterally and in the same parallel planes as the opposing front and rear faces of the first wrench.

Wrench head 11 has a slot 1 disposed therein. The slot 1 has a diameter which permits sliding the wrench head 11 over a fluid line and nut connection which has already been installed in its intended location. The slot 1 provides ease in attachment of the nut locking device because the fluid transmission line need not be evacuated, disassembled, reassembled with the locking device, and subsequently requalified for use in with fluids under high pressure.

On the end of the short handle is an integral ear 15 extending from one edge of the handle and normal to and outwardly from the front face of the handle, toward the opposing handle 16 of the second wrench 17 when the two wrenches are in the position shown in FIG. 3. The ear 15 has an annular opening 18 extending inwardly through the center of the ear, in a plane parallel to and in front of the front face of the wrench 11 and normal to the flat parallel edges of the handle.

The opening 18 has a smooth bore and is designed to closely circumscribe and hold a suitable threaded bolt 19 which is selected to extend through said annular opening and pass through a generally matching opening 20, slotted parallel to the long axis of the handle, in a second ear 23 which is integral to the second wrench 17, to be described and as shown in FIGS. 2A, 2B, 2C and 3.

Referring to FIGS. 2A, 2B, 2C and 3, the design and configuration of the second wrench is virtually identical to the first wrench. The internal diameter of the 12 point gripping surface may differ from that of the first wrench to accommodate a possible different size connecting nut 22, one of the two nuts used to detachably join the two fluid lines 27, 28.

To accommodate possible misalignment of the two openings in the ears of the two wrenches, the opening in the second ear is slotted to permit easier introduction of the bolt used to pull the two ears together after the connecting nuts have been torqued to close to their optimum value.

As shown in FIG. 3, the two wrenches are placed on the fluid lines behind their respective connecting nuts in such a way that the ears are on opposing edges of the first and second wrenches, as they face each other. The slots 1, 3 of the respective wrench heads do not hinder the grib of the wrench heads 11, 17 onto their respective connecting nut.

When the first 13 and second 22 hexagonal line connecting nuts have been tightened to approximately their optimum torque, using standard tightening means, such as hand tools (not shown), the locking nut wrenches of this invention are placed over the respective hexagonal nuts with the ears on each wrench angularly oriented in such a way that the annular opening 18 on the first ear 15 and the slotted opening 20 on the second ear 23 have a common central axis or as closely thereto as possible.

The body of the ear connecting bolt 23 is then inserted through the two ear openings and a suitable nut 24 is attached to the threaded end of the bolt. This nut is then tightened, drawing the two ears closer together, in generally parallel spaced relationship and without touching and creating the final torque adjustment to the two line connecting hexagonal nuts which hold the sealed gas lines being joined.

An alternative embodiment illustrates locking wrenches 25, 26 having a 6 point holding and gripping design which is well-known and commercially available and which closely circumscribes the appropriate hexagonal line connecting nut over a wider, flat surface and is designed to be thinner in radial cross-section for application where space is limited or where torque requirements may be greater.

Figure 5:
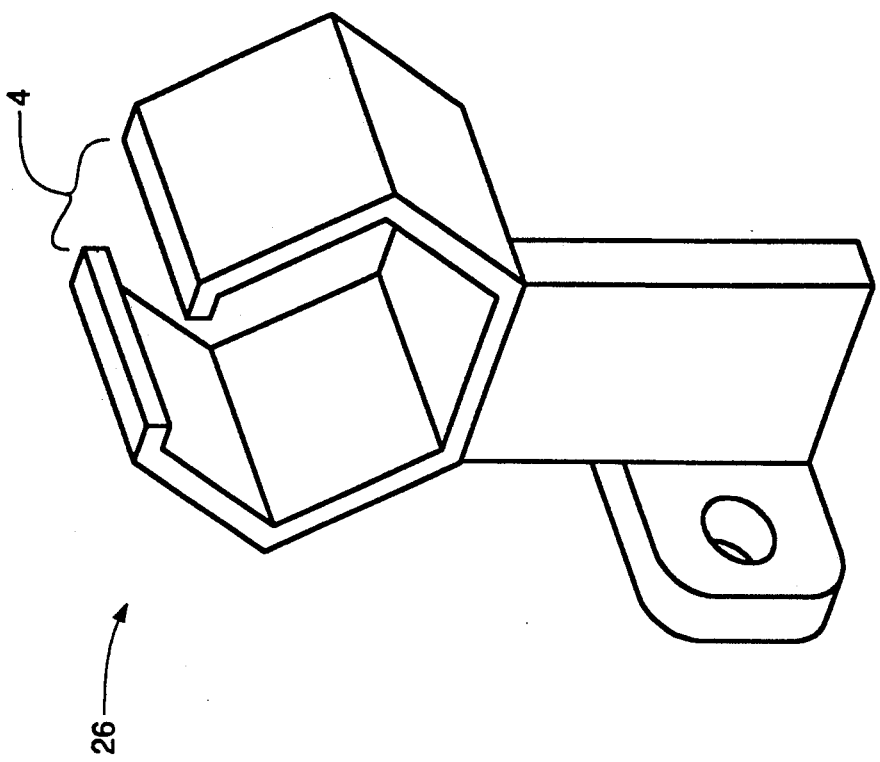
FIG. 4 and FIG. 5 are isometric views of the wrench-head nut locking assembly of FIGS. 2 used in an alternative embodiment of the present invention.
Figure 4:
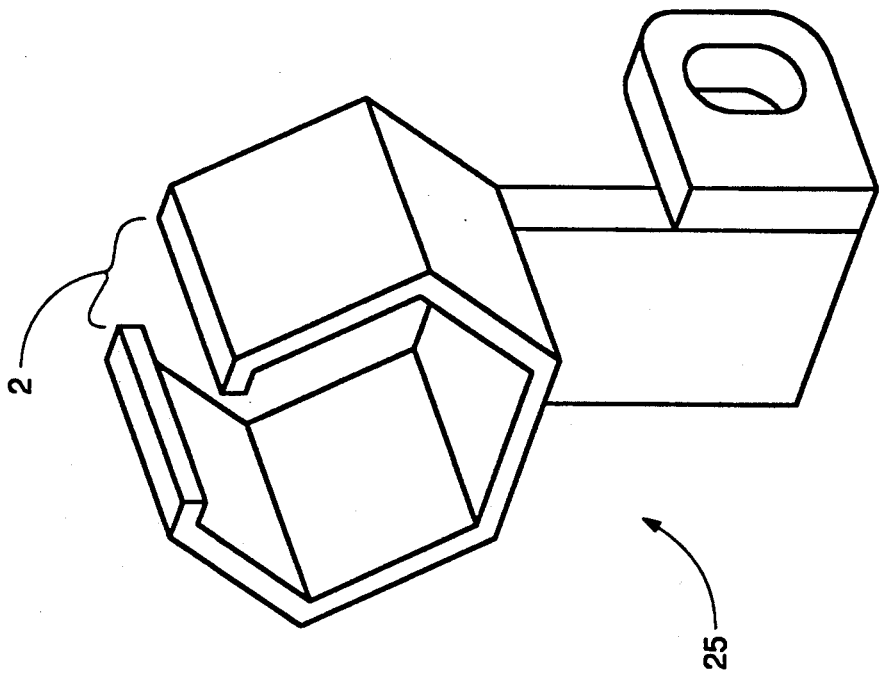

This design is shown in FIGS. 4 and 5. The general configuration of the two wrenches is basically the same, with the noted modification of the holding and gripping surfaces of the wrenches being changed from 12 point to six point design. The wrenches are also provided with slots 2, 4 to allow their installation over existing fluid lines. Otherwise the two wrenches work in a similar manner to those described in the first embodiment, with an appropriate tightening bolt to pull the opposing ears on the two handles together.

Other wrench head designs are possible and will vary depending on the shape of the connecting nut to which they are attached. In addition to the open or slotted wrench head, there is also the adjustable, or variable, or rachet designs. Hence, the wrench head can be design to adjust to fit various size nuts, or to have an open configuration with a closing mechanism.

The preferred material for the construction of the present invention is a metal. However, other possible materials include, but not limited to a variety of reenforced plastics or other polymer compounds.

This invention has been described in preferred embodiments but many modifications and variations will be obvious to those skilled in the art. However the scope of the present invention is not limited by the above described details but only by the appended claims.

What is claimed is:

1. A detachable, nut locking device to hold and secure typical connecting nuts used on standard fluid transmission line end adapter means to join and seal together separate fluid transmission lines, said device comprising:
    A. a pair of typical wrenches, each of standard design, each having a front and rear face and each configured to closely circumscribe, grip and hold an appropriate, typical connecting nut on a fluid transmission line end point adapter of known, commercial design;
    B. said pair of wrenches, each having a shortened handle integral thereto, with an integral ear, having a front face and a rear parallel face, extending in an L-shape from the end of the handle, normal to and with said faces parallel to the long axis of the handle and outwardly from the front face of said wrench;
    C. said ears on said wrench handles each having suitable and generally matching openings extending therethrough from front face to rear face, to permit removable introduction and passage of a suitable standard nut and bolt fastening means;
    D. a suitable standard bolt type fastener, of known design, with at least one threaded end and a matching threaded nut removably attachable thereto, to be used to draw together and hold said ears on said pair of said wrenches;
    E. said wrenches being each removably placed on the appropriate separate fluid transmission line end adapter means, behind the appropriately sized connecting nut attached thereto, and before the lines are joined, with the respective ears facing each other, said fluid transmission lines are then joined, with an appropriate seal, of known design, placed therebetween, said connecting nuts tightened to near their optimum torque, using conventional tightening means; and
    F. said pair of wrenches are then appropriately positioned on the connecting nuts and said standard bolt type fastener is inserted through the openings in the ears on the wrench handles, a nut attached thereto and tightened to hold and secure the connecting nuts and the seal from loosening and leaking during the operation and use of the fluid transmission lines.

2. The device according to claim 1, wherein said wrenches are at least one of open, variable, adjustable, and rachet.

3. A locking assembly useful for connecting high pressure fluid lines, said locking assembly comprising:
    a set of connecting nuts disposed on portions of a fluid line, said nuts for connecting said fluid line;
    a nut locking means for locking said connecting nuts in place, said nut locking means comprising:
    two lock halves;
    fastening means for fastening said lock halves together; and
    said lock halves comprise handles and wrench-type heads, said handles being located in opposition to said wrench-type heads, said handles having an orifice in which to dispose said fastening means.

4. The locking assembly of claim 3, wherein said wrench-type heads are configured to closely fit about said set of connecting nuts.

5. The locking assembly of claim 4, wherein said wrench-type heads have a slot, said slot having a diameter large enough to permit said nut locking means over the fluid lines and said connecting nuts.

6. The locking assembly of claim 5, wherein said fastening means comprises a screw and bolt assembly for securely fastening said handles in place.

7. The locking assembly of claim 5, wherein said handles further comprise an integral ear, having a front face and a rear parallel face, extending in an L-shape from the end of the handle, normal to and with said faces parallel to the long axis of each of said handles and outwardly from the front face of each of said wrench-type heads.

8. The locking assembly of claim 7, wherein said orifice is disposed in said integral ear of said handle.

9. The locking assembly of claim 5, further comprising a seal disposed between said connecting nuts and the fluid lines.

10. An apparatus useful in preventing fluid line leakage, said apparatus comprising:
    connecting means disposed about the fluid lines, said connecting means for connecting the fluid lines, said connecting means comprising at least two nuts;
    locking means disposed about said connecting means, said locking means for holding said connecting means in place, said locking means comprising at least two nut covers and two locking handles, said nut covers being disposed about said at least two nuts, said locking handles have an opening disposed therein; and
    a fastener, said fastener being disposed in said opening in said locking handles for fastening said handles together.

11. The apparatus of claim 10, wherein said not covers are retrofittable over said nuts after the fluid lines have been connected.

12. The apparatus of claim 10, wherein said nut covers comprise a wrench-type head, said wrench-type head having a configuration substantially similar to said nut.

13. The apparatus of claim 12, wherein said wrench-type head comprises a slot, said slot having a diameter such that said wrench-type head is slidable over the fluid line and said nut.

14. The apparatus of claim 13, wherein said fastener comprises a screw.

15. The apparatus of claim 13, wherein the fluid line is a high pressure fluid line.

16. The apparatus of claim 13, wherein said apparatus is comprised substantially of metal.

17. The apparatus of claim 13, wherein said apparatus is comprised substantially of a polymer.

* * * * *